United States Patent
Lee et al.

(10) Patent No.: US 6,709,785 B2
(45) Date of Patent: Mar. 23, 2004

(54) STACKED ELECTROCHEMICAL CELL AND METHOD FOR PREPARING THE SAME

(75) Inventors: Hyang-Mok Lee, Taejeon (KR); Soon-Ho Ahn, Taejeon (KR); Kyung-Joon Kim, Incheon (KR); Jae-Hyun Lee, Taejeon (KR)

(73) Assignee: LG Chemical Co., Ltd., Seoul (KR)

( * ) Notice: Subject to any disclaimer, the term of this patent is extended or adjusted under 35 U.S.C. 154(b) by 226 days.

(21) Appl. No.: 09/958,268

(22) PCT Filed: Feb. 8, 2001

(86) PCT No.: PCT/KR01/00187
§ 371 (c)(1),
(2), (4) Date: Oct. 5, 2001

(87) PCT Pub. No.: WO01/59868
PCT Pub. Date: Aug. 16, 2001

(65) Prior Publication Data
US 2002/0160257 A1 Oct. 31, 2002

(30) Foreign Application Priority Data
Feb. 8, 2000 (KR) .......................................... 2000-5849
Feb. 7, 2001 (KR) .......................................... 2001-5861

(51) Int. Cl.$^7$ .......................... H01M 6/46; H01M 2/18
(52) U.S. Cl. ................. 429/153; 429/152; 429/154; 429/162; 429/94; 429/144; 429/306; 429/130; 429/136; 429/132; 29/623.1; 29/623.3; 29/623.4
(58) Field of Search ................... 429/153, 152, 429/154, 162, 94, 144, 306, 130, 136, 132; 29/623.3, 623.1, 623.4

(56) References Cited

U.S. PATENT DOCUMENTS

| | | | |
|---|---|---|---|
| 2,798,895 A | 7/1957 | Nowotny | 136/111 |
| 5,300,373 A | 4/1994 | Shackle | 429/152 |
| 5,498,489 A | 3/1996 | Dasgupta et al. | 424/152 |
| 5,552,239 A * | 9/1996 | Gozdz et al. | 429/94 |
| 5,571,634 A | 11/1996 | Gozdz et al. | 429/192 |
| 5,580,676 A | 12/1996 | Honda et al. | 429/131 |
| 5,902,697 A | 5/1999 | Guindy et al. | 429/153 |

FOREIGN PATENT DOCUMENTS

KR    2001-0055968    7/2001

* cited by examiner

Primary Examiner—Patrick Ryan
Assistant Examiner—Angela J Martin
(74) Attorney, Agent, or Firm—Ladas & Parry (57) ABSTRACT

The present invention relates to an electrochemical element, specifically an electrochemical element with improved energy density comprising multiply stacked electrochemical cells.

In order to achieve such objects, the present invention provides an electrochemical element comprising electrochemical cells which are multiply stacked, said electrochemical cells formed by stacking full cells having a cathode, a separator layer, and an anode sequentially as a basic unit, and a separator film interposed between each stacked full cell wherein, said separator film has a unit length which is determined to wrap the electrochemical cells and folds inward every unit length to wrap each electrochemical cell starting from the center electrochemical cell to the outermost electrochemical cell continuously.

24 Claims, 9 Drawing Sheets

STACKED ELECTROCHEMICAL CELL AND METHOD FOR PREPARING THE SAME

BACKGROUND OF THE INVENTION (a) Field of the Invention

The present invention relates to an electrochemical element and a method of manufacturing the same, specifically to an electrochemical element with improved energy density comprising multiply stacked electrochemical cells and a method of manufacturing the same.

(b) Description of the Related Art

There has been growing interest on energy storage technology. The applicable field of the battery has been expanded to cellular phones, camcorders and notebook computers with recent addition of electric vehicles into this list. Such expansion has led to increased research and development of batteries with visible outcomes. In this respect, researches on electrochemical elements are one of the fields that have been receiving much attention, among which rechargeable battery is the central field of interest. Recent developments have turned its way to designing new batteries and electrodes to improve capacity and specific energy.

Among the secondary batteries being used, lithium ion battery developed in the 1990s has become increasingly popular because it has higher operating voltage and energy density compared to Ni—MH, Ni—Cd, and sulfuric acid-lead batteries that use aqueous solution electrolyte. These lithium ion batteries, however, have safety problems resulting from the use of organic electrolyte, which causes the batteries to be flammable and explosive. Also, lithium ion has the weakness of having difficult manufacturing process. Recent lithium ion polymer batteries have overcome such shortcomings of the lithium ion batteries and are anticipated to become the batteries of the next generation. These lithium ion polymer batteries, however, have relatively low capacity compared to lithium ion batteries and have especially insufficient discharging capacity at low temperatures; and thus, need to be improved.

The capacity of the batteries is in proportion to the amount of the electrode active materials. Thus, it is extremely important to design a cell structure that can be filled with as much quantities of electrode materials as possible within the limited space of the battery package. The most widely known and used type of cell structure is a jellyroll shaped structure used in a cylindrical or a prismatic battery. Such a structure is prepared by a process of coating and pressing active electrode material onto a metal foil which is used as a current collector, followed by cutting it into a shape of a strip having predetermined width and length, and then separating the anode and cathode using the separator film, and then winding it into a spiral form. Such a jellyroll structure is widely used for manufacturing cylindrical batteries. This structure, however, has small radius of curvature at the center portion of the spiral, which often results in extreme stresses at the bending surface of the electrode, often causing exfoliation of the electrode. This facilitates the deposition of lithium metal at the center portion of the electrode during the repeated charge and discharge of the battery, which may shorten the lifespan of the battery while degrading the safety of the battery.

Generally, the widely known and used method of manufacturing a thin prismatic shaped battery comprises aforesaid process of winding the spiral shaped jelly roll into an oval shape and then compressing it, followed by inserting it into a rectangular container. This method is not free from aforesaid problems of reduced lifespan and safety, but rather has increased problems caused by the decrease in the radius of curvature due to the oval shape. Also, the problem of reduced performance is greater because manufacturing a tight spiral structure is inherently impossible. Furthermore, discrepancy of the oval shape of the jelly role and the rectangular shape of the container reduces the rate of utilized volume. This is known to reduce approximately 20% of the weight energy density and 25% of the volume energy density when the container is taken into account. In reality, a prismatic lithium ion battery is reported to have lower capacity density and specific energy compared to a cylindrical one.

Recently, various patents and technologies proposing to solve the problems of the spiral jelly roll type structure and providing cell structures suitable for a prismatic container are being published. These proposals, however, only provides partial solution to the problems or causes other problems more difficult to solve so that they have not become a practical solution. For example, U.S. Pat. No. 5,552,239 describes a process of first placing and laminating a separator layer or polymer electrolyte between the cathode and anode, then cutting it into a form of a strip with predetermined length and width, followed by gradually folding a cell having an anode/separator layer/cathode layered structure into a square form. The inventors of the present invention have tried to replicate such a process but have found out that it was difficult to manufacture the cells for such a use. The laminated cells were so stiff that it was difficult to fold and when it was folded by exerting force, the problem arose in the folded area because it was fractured in a manner similar to the jellyroll typed cells.

In fan-folding method described in U.S. Pat. No. 5,300,373, the pressure and stresses at the inner layer of the abruptly bending portion are transferred to the outer layer and diverged so that twisting and stretching occur, finally resulting in a "dog bone" shaped cell. Thus, the problems of exfoliations, cracks, crumbles or snapping, encountered in jelly role type structure also occur frequently. Also, the cells with this structure are inherently prone to snapping; and therefore, the possibility of making a practically applicable battery is very low.

Meanwhile, U.S. Pat. No. 5,498,489 attempted to solve and improve such problems in the bending portions. It provides a fundamental way of avoiding exfoliation of the electrodes by leaving out the electrodes at the folding portions and providing connections only through the use of current collectors and separator layers or polymer electrolyte portions. But, there is difficulty in composing such a cell. Furthermore, too much current collectors are used and the structure wastes too much electrolyte. Thus, the structure is not very practical because it has many inefficient factors.

SUMMARY OF THE INVENTION

It is an objective of the present invention to provide an electrochemical element comprising electrochemical cells which are multiply stacked, wherein it is easy to manufacture, and has a structure making efficient use of the space available and a method of manufacturing the same while considering the prior art.

It is another objective of the present invention to provide an electrochemical element and a method of manufacturing the same that can maximize the content of the active electrode material and can be manufactured easily.

These and other objectives may be achieved by an electrochemical element comprising electrochemical cells which are multiply stacked, said electrochemical cells formed by stacking full cells having a cathode, a separator layer, and an anode sequentially as a basic unit, and a separator film interposed between each stacked full cell wherein, said separator film has a unit length which is determined to wrap the electrochemical cells and folds inward every unit length to wrap each electrochemical cell starting from the center electrochemical cell to the outermost electrochemical cell continuously.

Also, the present invention provides a method of manufacturing an electrochemical element using the full cell comprising the steps of, a) placing a first full cell at a first spot of a side of the separator film, placing a second full cell at a distance corresponding to the width plus thickness of the full cell away in longitudinal direction of the separator film, and placing a third full cell and next full cells at a distance corresponding to the thickness of the full cell plus thickness of the film incremented as the film is folded;

b) laminating the placed full cells and the separator film of a); and c) folding and winding inward the laminated full cells and the separator film of b) to the full cell adjacent next to the first full cell so that each full cell is folded to stack the full cells.

Furthermore, the present invention provides an electrochemical element comprising electrochemical cells which are multiply stacked, said electrochemical cells formed by stacking i) a bicell having a cathode; a separator layer; an anode; another separator layer; and another cathode sequentially as a basic unit; and ii) a bicell having an anode; a separator layer; a cathode; another separator layer; and another anode sequentially as a basic unit; and a separator film interposed between each stacked bicells wherein, said separator film has a unit length which is determined to wrap the electrochemical cells and folds inward every unit length to wrap each electrochemical cell starting from the center electrochemical cell to the outermost electrochemical cell continuously.

Still furthermore, the present invention provides a method of manufacturing an electrochemical element using the bicell comprising the steps of a) placing a first bicell at a first spot of the separator film and placing a second bicell at a distance corresponding to the width plus thickness of the bicell away in longitudinal direction of the separator film and placing a third bicell and next bicells at a distance corresponding to thickness of the bicell plus thickness of the film incremented as the film is folded;

b) laminating the placed bicells and the separator film in a); and c) folding and winding inward the laminated bicells and the separator film of b) to the bicell adjacent next to the first bicell so that each bicell is folded to stack the bicells.

DETAILED DESCRIPTION OF THE PREFERRED EMBODIMENTS

Hereinafter, the present invention will be discussed in detail with reference to the figures.

Function

The present invention provides a cell structure and a method for the preparation thereof, which is more convenient to manufacture and uses space more efficiently compared to conventional cells. The present invention provides a unique but a simple way of maximizing the content of electrode active material in a prismatic battery while solving various shortcomings of various conventional cell structures discussed above. In principle, the present invention does not make avail of longitudinally cut electrodes used for spiral winding or folding, but rather uses the method of stacking electrodes cut in a predetermined form.

The electrochemical cells according to the present invention are stacked with a full cell or a bicell as a basic unit.

Figure 1:
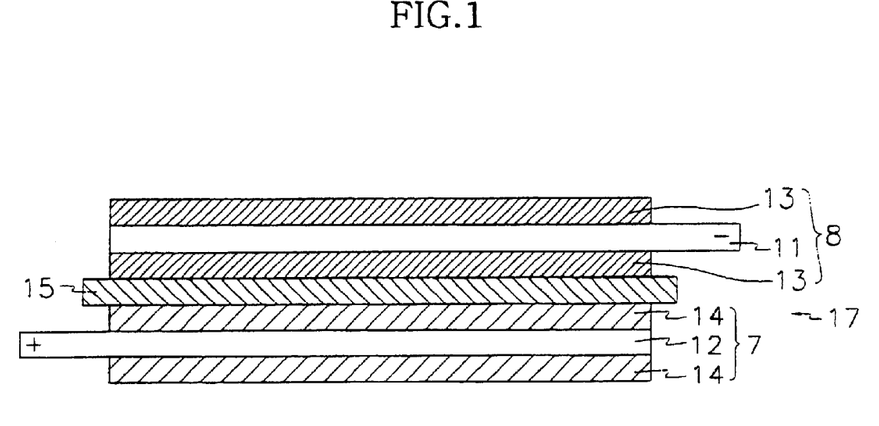
FIG. 1 shows a layered structure of a full cell comprising a both-side coated cathode, an anode and a separator layer.

The full cell of the present invention has a structure where a layered construction of a cathode 7, an anode 8 and a separator layer 15 is cut into a regular shape and regular size and then stacked as shown in FIG. 1. All the electrodes use current collectors 11 and 12 coated with electrode active material 13 and 14 on both sides. Such a structure is treated as a single unit cell to constitute a battery by stacking. For such a purpose, the electrodes and the separator films must be fixed to each other. For example, in a lithium rechargeable cell, the main component of the cathodic material 14 is lithium intercalation materials such as lithium manganese oxide, lithium cobalt oxide, lithium nickel oxide or a complex oxide formed from a combination of aforesaid oxides, said cathodic material coated on the cathode current collector 12, that is, a foil prepared from aluminum, nickel, or a combination thereof to form a cathode 8. Also the main component of the anodic material 13 is lithium metal or lithium alloy, and lithium intercalation materials such as carbon, petroleum coke, activated carbon, graphite or other carbons, said anode material 13 coated on anode current collector 11, that is, a foil prepared from copper, gold, nickel, copper alloy or a combination thereof to form an anode 7.

The separator layer 15 includes a micro-porous polyethylene film, a micro-porous polypropylene film, or a multi-layer film prepared by a combination thereof, or a polymer film for solid polymer electrolyte or gel-type polymer electrolyte such as polyvinylidene fluoride, polyethylene oxide, polyacrylonitrile or polyvinylidene fluoride hexafluoropropylene copolymer. Furthermore, it is very efficient to use a polymer film for polymer electrolyte including a primary micro-porous polymer layer and a secondary gelling polymer layer of polyvinylidene fluoride-chlorotrifluoroethylene copolymer described in Korean Patent Application No. 99-57312. An important feature needed for the separator layer 15 is a bonding characteristic from laminating for constituting a unit cell which is a full cell.

Figure 2:
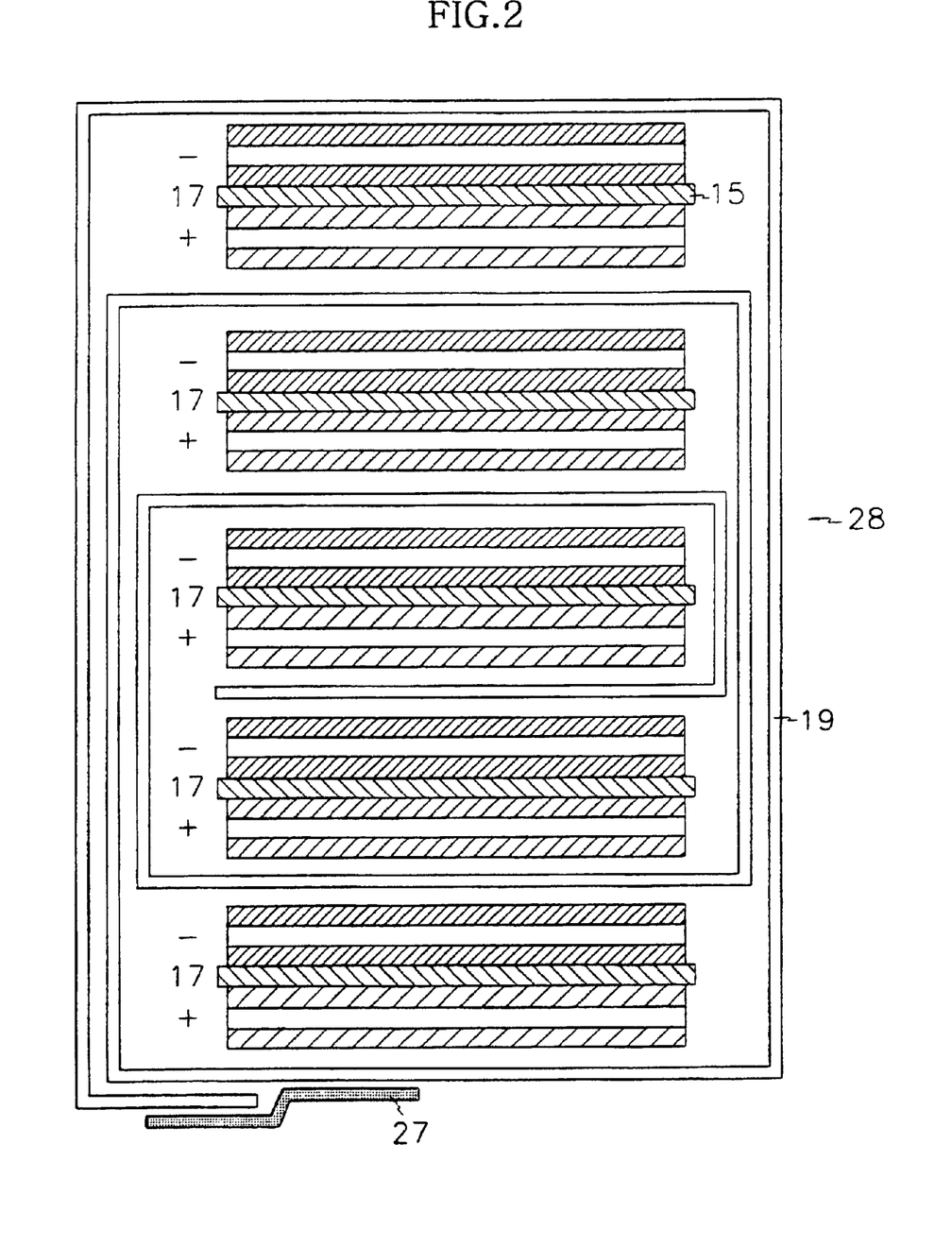
FIG. 2 shows a layered structure of the cell where multiple full cells are stacked and a separator film is interposed between stacked cells.

The unit structure of the full cell 17 shown in FIG. 1 is composed of a cathode, a separator layer, and an anode sequentially. The separator layer 15 is naturally placed in the center of the cell. A plurality of theses unit cells can be stacked in a number desired to implement a battery with practical capacity. For example, FIG. 2 shows five full cells sequentially stacked. The way of interposing a polymer separator layer or a polymer separator film having micro porous for polymer electrolyte is extremely important as explained above for separator layer 15 and FIG. 2 shows a way the present invention provides. Starting from the full cell at the middle, the longitudinally cut separator film 19 is folded so that the full cells 17 are stacked one by one. Such a structure becomes a very efficient structure because the outer active coating material not used within a unit cell is shared with opposite electrode active coating material of another adjacent unit cell. The separator film 19 is finished by fixing and securing a tape 27. Furthermore, the finishing can use thermo-fusing besides taping. That is, the separator film itself is fixed and bonded by heat-sealing which carry out bring a thermo-welding machine, a hot plate, or etc into contact with the separator film. The number of full cells to be stacked is determined according to the desired capacity of the finished battery.

In the present invention, the structure 28 of FIG. 2 has another meaning. According to the experience of the inventors of the present invention, the surfaces between the separator films such as film for polymer electrolyte film or the polymer separator layer and electrodes are important. When the battery is actually used after injecting liquid electrolyte and packaging, it is subject to numerous charging and discharging cycle. When the contact of the surface is not constantly maintained and becomes unstable, the performance of the battery drops suddenly and actual capacity of the battery decreases. According to the structure of the battery, this effect can be shown from the beginning or can be revealed as time passes by. Therefore, there is a need to exert pressure to constantly maintain the surfaces. The present invention provides a new cell structure and method of assembling as a way of maintaining the pressure while fundamentally solving above problem. In this context, FIG. 2 has another meaning.

As can be seen in structure 28 of FIG. 2, a way of stacking the unit cells of full cells while interposing the separator film 19 efficiently uses the electrodes between the full cells. Also, the surrounding pressure of the wrapping separator film 19 presses the surfaces between the polymer film and the electrodes forming all the cells. A final finishing using a tape 27 is a measure to constantly maintain such a pressure, which allows stable and constant contact between the surfaces.

A different material or same material of polymer separator layer or polymer film for polymer electrolyte can be used for a separator layer 15 and separator film 19. The separator layer 15 must have bonding characteristic from laminating to constitute a unit cell which is a full cell, but the separator film 19 does not need to have such a characteristic because it is possible to wrap the full cells 17 by the separator film 19 for assembling. But, for another type of assembling using a cell structure as shown in structure 28 of FIG. 2, it is preferable to use the separator film 19 that also has the bonding characteristic. In this respect, it may be most appropriate to use the polymer film for polymer electrolyte as a separator film 19 comprising a first micro-porous polymer layer and a second gelling polymer layer of polyvinylidene fluoride-chlorotrifluoroethylene copolymer for the battery according to the present invention. When the new polymer film is used as the separator film 19, there can be a large variety of assembling method in structure 28 of FIG. 2. That is, every full cell 17 has two possible directions, that is the upper direction and the lower direction for bonding to the separator film 19. If there are five full cells as in FIG. 2, there can be $2^5$ kinds of ways of assembling. In such a method, after the separator film 19 is spread in a longitudinal direction, full cells are disposed in upper or lower side of the separator film 19 according to any of the $2^5$ ways, and then laminated followed by simply wrapping and folding. The merit of this method is the facility of assembling process of designing and disposing.

Figure 3:
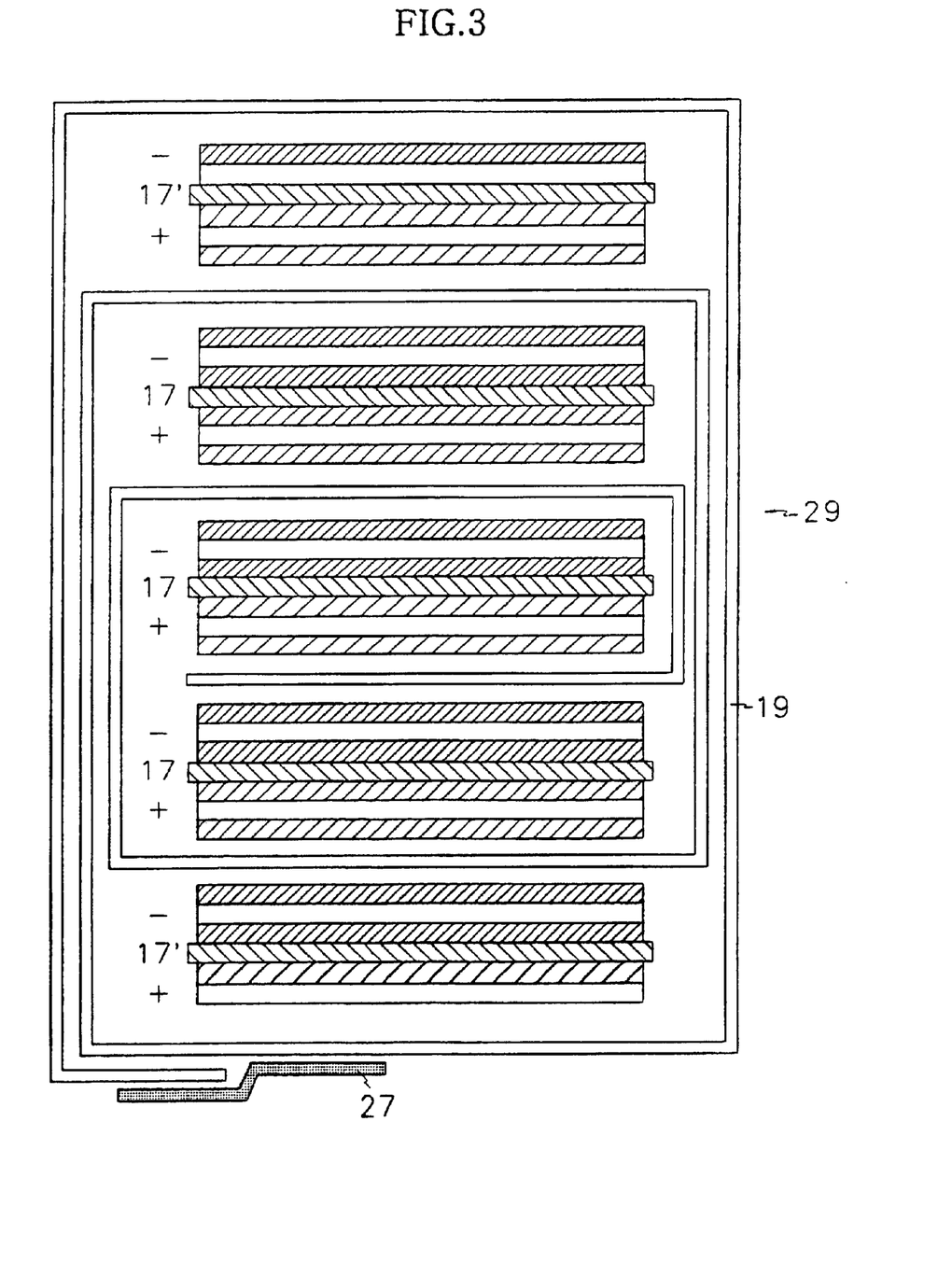
FIG. 3 shows a layered structure of a cell comprising multiply stacked full cells having a single side of an outermost electrode of an outermost full cell coated and left as a foil, and having a separator film interposed between the full cells.

FIG. 3 shows structure 29 which eliminates the unused outermost active electrode material from the structure 28 of FIG. 2 so that the structure has the maximum space efficiency. When another full cell 17' is defined as a full cell structure having one electrode coated on both sides and the other electrode coated on a single side, structure 29 of FIG. 3 adopts such a full cell 17' so that the outermost active electrode material not used is left as a foil as shown in structure 28 of FIG. 2. This results in the additional decrease in the thickness without losing the capacity of each electrode so that the space efficiency is increased furthermore. But, when the stacked cells are increased, it does not show much difference in space utilization efficiency compared to the structure 28 of FIG. 2. Nevertheless, structure 29 of FIG. 3 is effective in a very thin layer card typed battery recently being discussed.

Figure 4A:
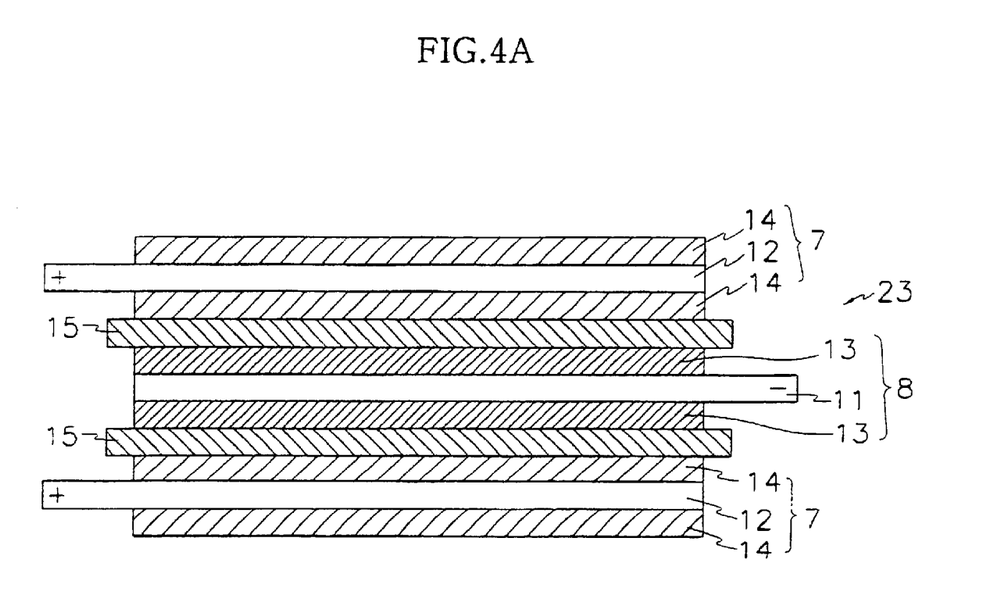
FIG. 4a shows a layered structure of a bicell where a middle layer is an anode and both outer sides are cathodes.
Figure 4B:
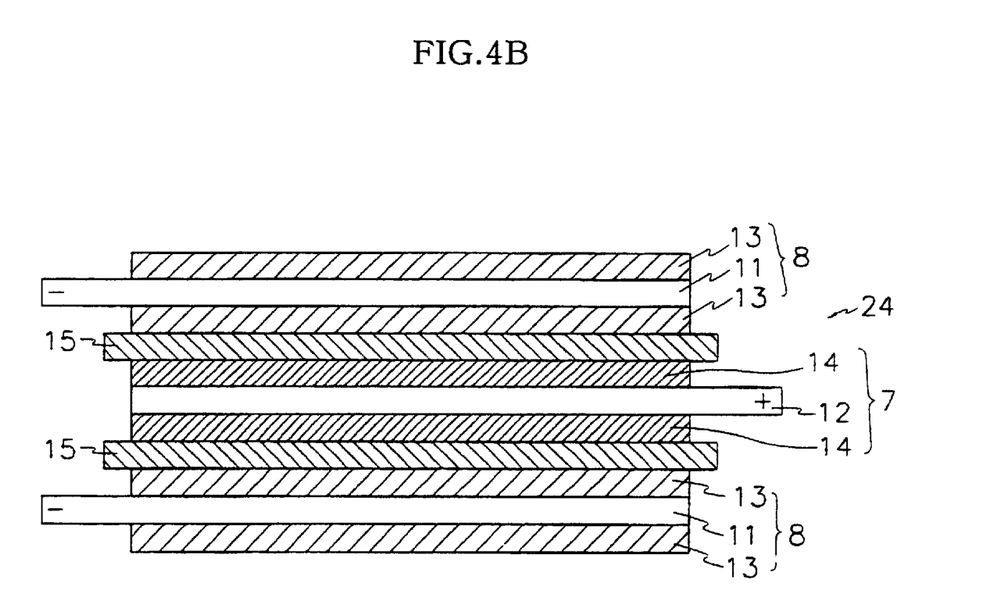
FIG. 4b shows a layered structure of a bicell where a middle layer is a cathode and both outer sides are anodes.
Figure 5:
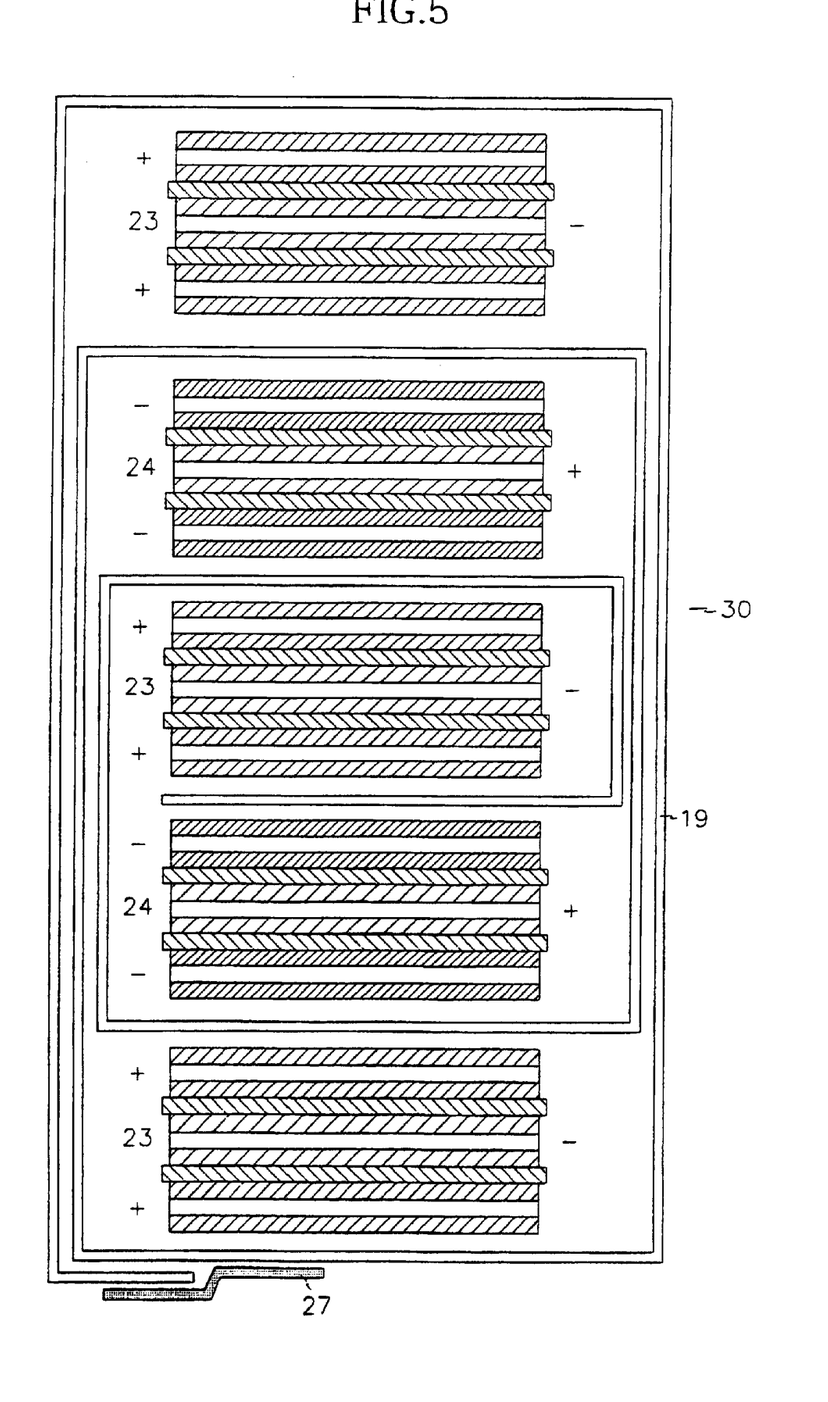
FIG. 5 shows a layered structure of a cell where two types of bicells are alternately stacked with an interposed separator film between the bicells.
Figure 6:
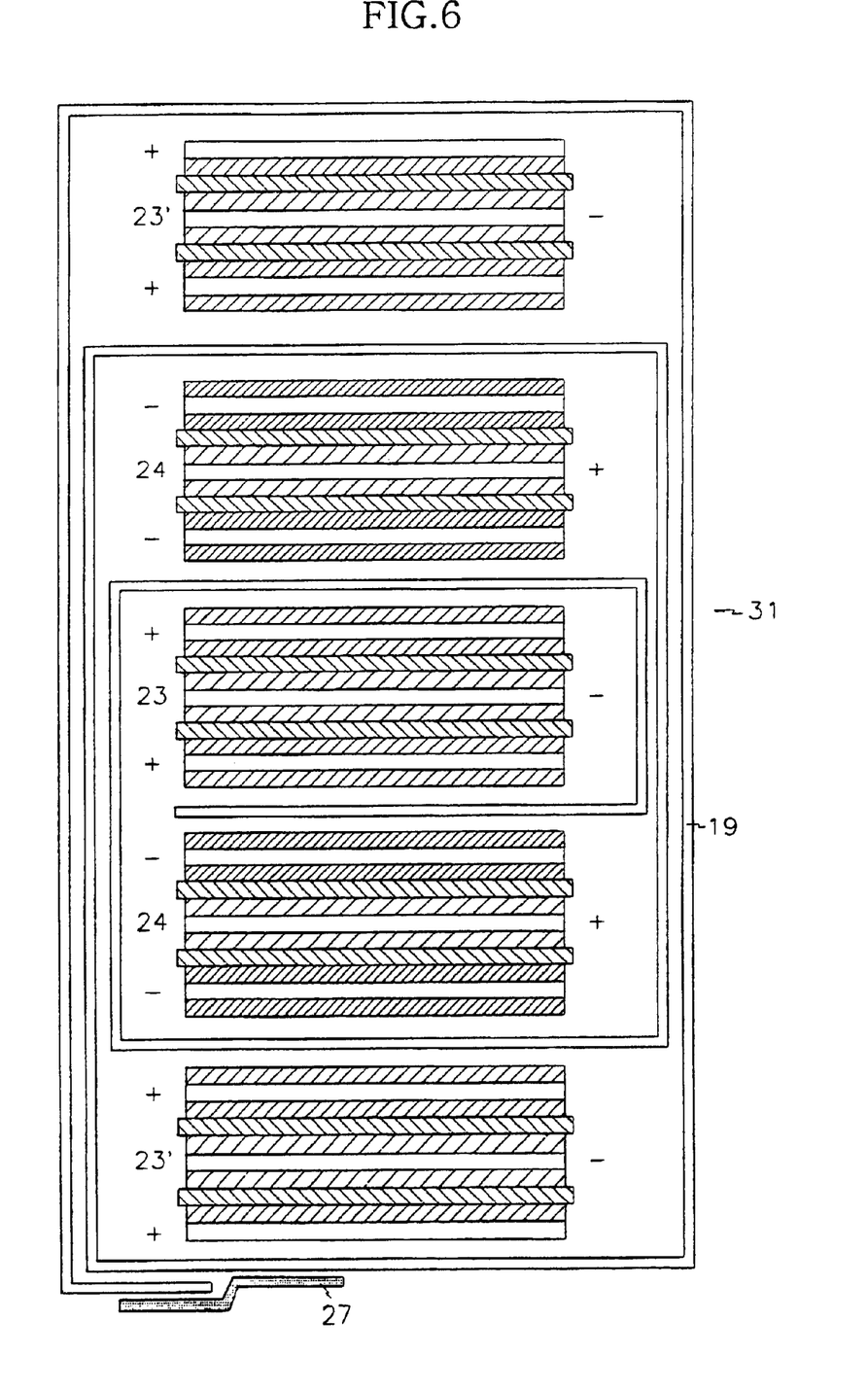
FIG. 6 shows a layered structure of a cell comprising bicells having a single side of an outermost electrode of an outermost bicell coated and left as a foil, two types of bicells being alternately stacked, and having a separator film interposed between the cells.

In the present invention, when a plurality of bicells is stacked as a unit cell, the space efficient cell structure is applied in a manner identical to the above method. For such a purpose, two types of bicells 23 and 24 are respectively defined both of which uses a both-side coated electrode as shown in FIGS. 4a and 4b. The bicell 23 has an anode placed in the middle and cathodes placed in both outer sides whereas the bicell 24 has a cathode placed in the middle and anodes placed in both outer sides. The usable active electrode material and polymer separator layer or polymer film for polymer electrolyte as a separator layer 15 is same in detail as discussed above in the full cells. Structure 30 of FIG. 5 shows a way of constituting a battery using two types of bicells as basic unit cells. When the bicell 23 and 24 are alternately stacked, and aforementioned polymer separator layer or separator film 19 such as polymer film for polymer electrolyte are inserted between the bicells, the outer active coating material not used within a bicell is naturally shared with an opposite polarity of another type of adjacent bicell, forming a new full cell which has a very efficient structure. As can be seen in structure 30 of FIG. 5, if the separator films 19 are interposed continuously between the cells and the bicells are alternately stacked, the polarity of the battery is naturally formed without discrepancy. The outermost-stacked bicell of the battery can be either bicell 23 or bicell 24, the only difference being whether the unused electrode material is an anode or a cathode. The proportion of such unused electrodes decreases as the number of stacks increases and it has little influence for electrode with a practical thickness. In other structure 30, the way and structure of inserting the separator film 19 is identical to those of full cell in every detail and the a separator film 19 and tape 27 functioning under such a structure also has the same meaning, FIG. 6 shows a structure 31 eliminating the outermost active electrode material from the structure 30 of FIG. 5 so that the structure has maximum space efficiency. When the primes(') denote structures where only one out of two outer electrodes of the bicell is left as the foil, a structure stacking a bicell 23' as the outermost bicell of the battery (it does not matter whether the outermost bicell is bicell 23' or bicell 24') as in structure 31 of FIG. 6 leaves the unused portion of the outermost active electrode material as the foil so that the thickness is further reduced not losing the space efficiency. This allows the merit of directly being related to the space efficiency. When the layers of bicells being stacked increase, it does not show much difference from structure 30 of FIG. 5 in terms of the space efficiency. In a thin layer card typed battery, however, the structure of stacked cell 31 of FIG. 6 is effective.

The battery structure provided in the present invention is very effective for a prismatic battery. Generally, liquid electrolyte is injected when packaging. For such a purpose, aluminum prismatic can or an aluminum-laminate film can be used as a container. The liquid electrolyte is a salt of $A^+B^-$ dissolved or dissociated in an organic solvent wherein the $A^+$ comprises an alkaline metal cation such as $Li^+$, $Na^+$, or $K^+$ or combination thereof, the $B^-$ comprises an anion $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ or $C(CF_2SO_2)_3^-$ or combination thereof and the organic solvent comprises propylene carbonate(PC), ethylene carbonate(EC), diethyl carbonate(DEC), dimethyl carbonate(DMC), dipropyl carbonate(DPC), dimethylsulfoxide, acetonitrile, dimethoxyethane, diethoxyethane, tetrahydrofurane, N-methyl-2-pyrrolidone (NMP), ethylmethyl carbonate(EMC), or γ-butyrolactone or combination thereof. Unlike a jelly roll of a lithium ion battery, the constituents of the battery according to the present invention have a form coinciding with the form of the quadrilateral container so that there will be no unused space within the container. Therefore, the energy density of the battery can be greatly increased to implement a highly integrated battery having maximized space efficiency of active materials.

The electrochemical element of the present invention can be applied to the various fields such as supercapacitors, ultracapacitors, primary batteries, secondary batteries, fuel cells, sensors, electrolysis devices, electrochemical reactors, and etc, besides lithium secondary batteries.

The present invention will be explained in detail with reference to the examples. These examples, however, should not in any sense be interpreted as limiting the scope of the present invention.

EXAMPLES

Example 1
Preparing a Stacked Cell Where a Full Cell is a Basic Unit
(Preparing a Cathode)
$LiCoO_2$: carbon black: PVDF, of which the weight ratio was 95:2.5:2.5, was dispersed in NMP in order to prepare slurry, and then the slurry was coated on an aluminum foil. After sufficiently drying at 130° C., the cathode was prepared by pressing.

A cathode of the full cell was prepared by coating the slurry on both sides of aluminum foil. That is, the cathode has a cathodic material coated on both sides of the aluminum cathode current collector. The thickness of the both-side coated cathode was 140 μm.

(Preparing an Anode)
Graphite: acetylene black: PVDF, of which the weight ratio was 93:1:6, was dispersed in NMP in order to prepare slurry, and then the slurry was coated on a copper foil. After sufficiently drying at 130° C., the anode was prepared by pressing.

An anode of the full cell was prepared by coating the slurry on both sides of copper foil. That is, the anode has an anodic material coated on both sides of the copper anode current collector. The thickness of the both-side coated anode was 135 μm.

(Preparing a Separator Layer; a Separator Film; a Polymer Film for Polymer Electrolyte)
A multi-layer polymer film was prepared wherein polypropylene film having a microporous structure and a thickness of 16 μm was a first polymer separator layer and polyvinylidene fluoride-chlorotrifluoroethylene copolymer 32008(Solvay) was a second gelling polymer. 6 g of the 32008 was added to 194 g of acetone and stirred at 50° C. After 1 hour, the completely dissolved transparent 32008 solution was coated on the polypropylene first polymer separator layer by a dip coating process. The thickness of coated 32008 was 1 μm and the thickness of the final multi-layered polymer film was 18 μm. Here, a same material was used for the separator layer and the separator film.

(Preparing a Full Cell)
Seven full cells 17 of FIG. 1 were prepared by cutting the cathode having cathodic material coated on both sides of a cathode current collector to the size of 2.9 cm×4.3 cm of rectangle, except for the area where a tab was to be formed (the area where a tab was to be formed should not be coated with electrode material), cutting the anode having anodic material coated on both sides of an anode current collector to the size of 3.0 cm×4.4 cm of rectangle, except the area where a tab was to be formed(the area where a tab was to be formed should not be coated with electrode material), cutting a multi-layered polymer film prepared in a manner mentioned above to the size of 3.1 cm×4.5 cm, interposing the above film between the anode and the cathode, and passing it through a roll laminator of 100° C. to laminate each electrodes and the separator layer.

Figure 7:
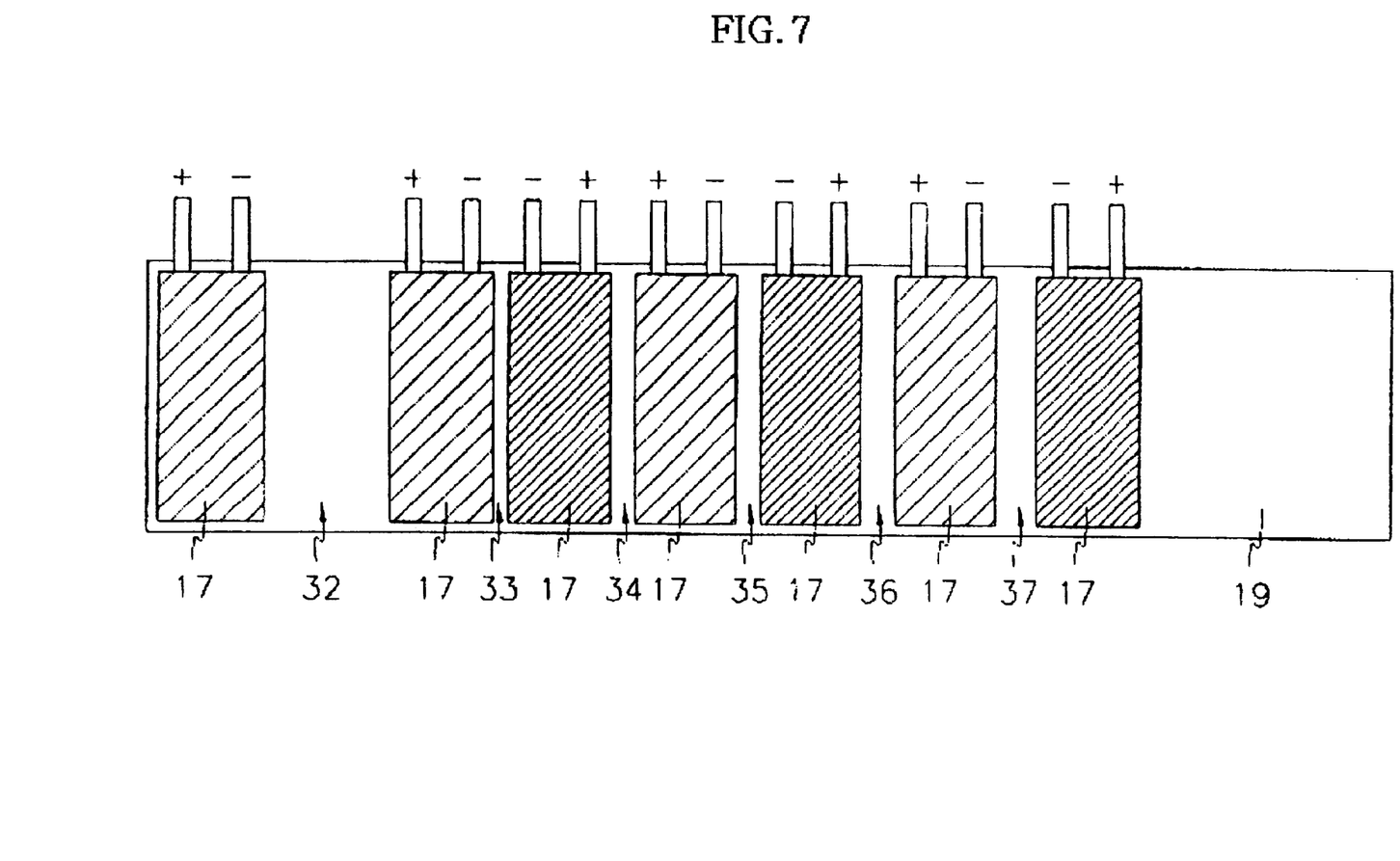
FIG. 7 is a development figure of a battery where full cells are placed on a cut separator film and then laminated so that the full cells are accurately aligned for stacking.

(Stacking Full Cells)
After cutting the polymer film 19 for the polymer electrolyte manufactured as above longitudinally, the seven full cells were aligned as shown in FIG. 7. The space of the reference numeral 32 denotes spacing of width of the full cell (including the thickness of the full cell), and the gaps of the reference numerals 33, 34, 35, 36 and 37 denote spacing of thickness (including the thickness of the full cell) increased as it is rolled along. The surface, on which the full cell is laid, is disposed as shown in FIG. 7 so that the polarities of the tabs coincide. That is, the direction of the electrodes of the first and second full cells are disposed in the sequence of cathode and then the anode, and the direction of the electrodes of the third full cell or next full cells are disposed in the reverse order.

The polymer film 19 having the full cells placed thereon is passed through a roll laminator so that the full cells are bonded onto the polymer film 19.

The polymer film is wound starting from the full cell 17 bonded on the first spot, and then it is tightly fixed and secured using a tape.

(Preparing a Battery)

The full cell stacked battery prepared as above was placed within the aluminum laminate package. Then the liquid electrolyte comprising 1:2 weight ratio of EC/EMC of 1 M LiPF$_6$ was injected and packaged.

(Evaluation)

Figure 9:
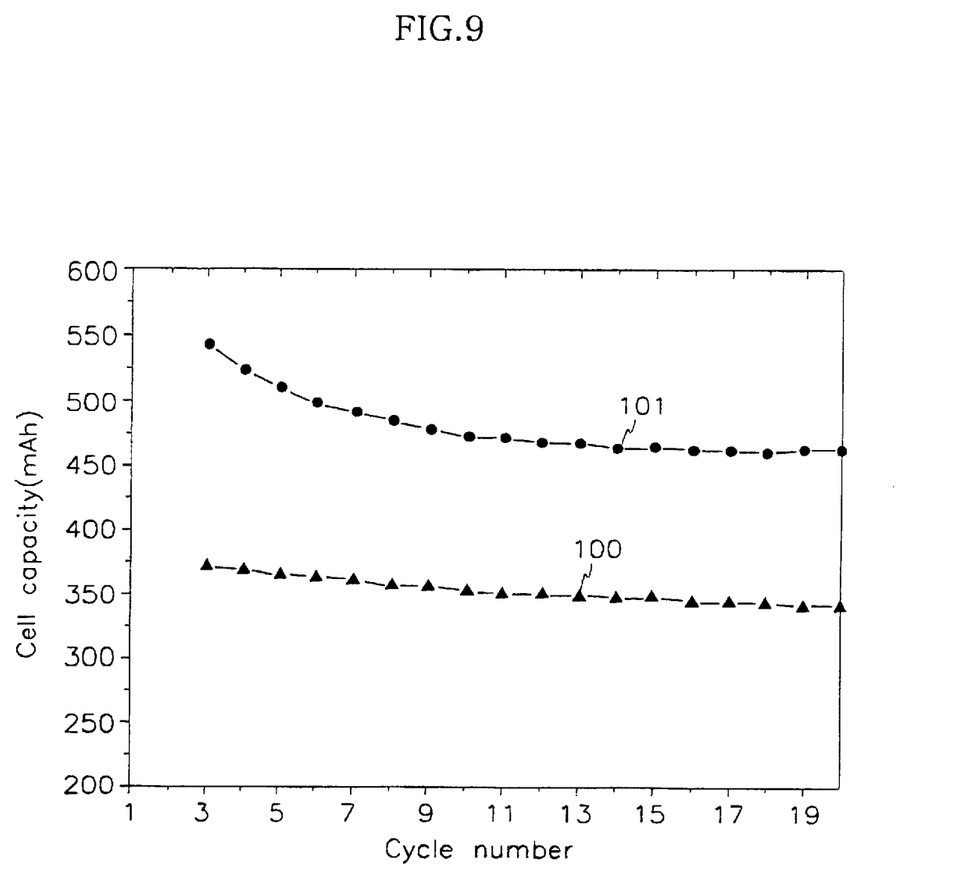
FIG. 9 shows a cycle characteristic of an electrochemical element according to example 1 and example 2 of the present invention.

Using the charging and discharging experiment, the evaluation of the cycle characteristic of the battery is shown in FIG. 9. Reference numeral 100 shows the cycle characteristic of the manufactured battery where 0.2C is charged and discharged at first and second time followed by 0.5C charges/1C discharges from the third time from which it is illustrated on the graph.

Example 2
Preparing a Stacked Cell Where a Bicell is a Basic Unit (Preparing a Cathode)

Each cathode was prepared according to the method same as the above example 1.

A cathode of the bicell was prepared by coating the slurry on both sides of aluminum foil. That is, the cathode has a cathodic material coated on both sides of the aluminum cathode current collector. The thickness of the both-side coated cathode was 140 $\mu$m.

(Preparing an Anode)

Each anode was prepared according to the method same as the above example 1.

An anode of the bicell was prepared by coating the slurry on both sides of copper foil. That is, the anode has an anodic material coated on both sides of the copper anode current collector. The thickness of the both-side coated anode was 135 $\mu$m.

(Preparing a Separator Layer; a Separator Film; a Polymer Film for Polymer Electrolyte)

The separator layers, separator films, and polymer film for polymer electrolyte were prepared in a manner identical to the example 1.

(Preparing a Bicell)

The cathode having aforesaid cathodic material coated on both sides of a cathode current collector was cut to the size of 2.9 cm×4.3 cm of rectangle, except for the area where a tab was to be formed. The anode having anodic material coated on both sides of an anode current collector was cut to the size of 3.0 cm×4.4 cm of rectangle, except for the area where a tab was to be formed.

Four bicells 23 of FIG. 4a were prepared by placing both-side coated anode in the middle and the both-side coated cathodes at both outer sides, placing a multi-layered polymer film prepared according to the aforesaid manner which was cut into the size of 3.1 cm×4.5 cm between each anode and each cathode, and then passing it through a roll laminator of 100° C. to laminate the electrodes and the separator layer. Other bicells, that is, three bicells 24 of FIG. 4b were prepared by placing the both-side coated cathode in the middle and the both-side coated anodes at both outer sides, placing a multi-layered polymer film prepared according to the aforesaid manner which was cut into the size of 3.1 cm×4.5 cm between each anode and each cathode, and then passing it through a roll laminator of 100° C. to laminate the electrodes and the separator layer.

(Stacking Bicells)

Figure 8:
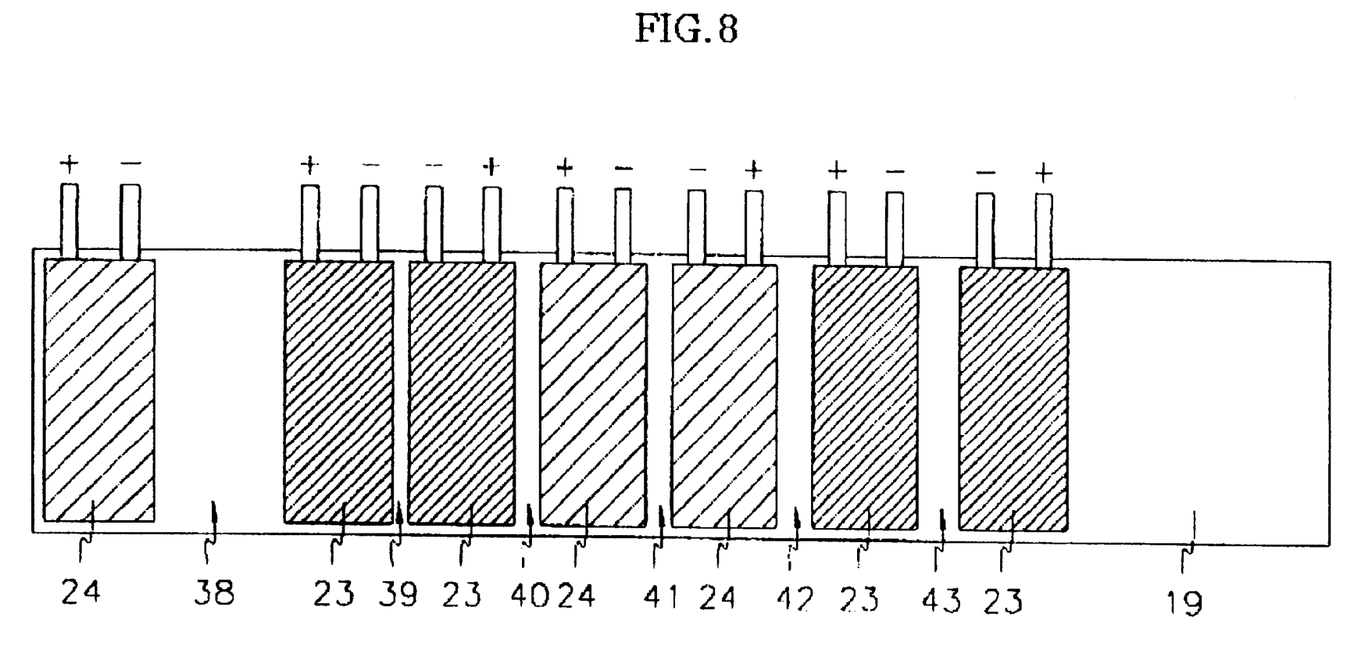
FIG. 8 is a development figure of a battery where two types of bicells are placed on a cut separator film and then laminated so that the bicells are accurately aligned for stacking.

All laminating of the electrodes and the polymer film was carried out in a roll laminator of 100° C. After cutting the polymer film 19 for the polymer electrolyte manufactured as above longitudinally, the seven full cells were aligned with space as shown in FIG. 8. The space of the reference numeral 38 denotes spacing of width of the bicell (including the thickness), and the gaps of the reference numerals 39, 40, 41, 42 and 43 denote spacing of thickness increased as it is rolled along. The surface, on which the bicell is laid, is disposed as shown in FIG. 8 so that the polarities of the tabs coincide. That is, the direction of the electrodes of the first and second bicells are disposed in the sequence of cathode and then the anode, and the direction of the electrodes of the third bicell or next bicells are disposed in the reverse order, so that the bicells are disposed in the sequence of 24, 23, 23, 24, 24, 23 and 23.

The polymer film 19 having the bicells placed thereon is passed through a roll laminator so that the bicells are bonded onto the polymer film 19.

The polymer film is wound starting from the bicell 17 bonded on the first spot, and then it is tightly fixed and secured using a tape.

(Preparing a Battery)

The stacked bicell battery prepared as above was placed within the aluminum laminate package. Then the liquid electrolyte comprising 1:2 of EC/EMC of 1 M LiPF$_6$ was injected and packaged.

(Evaluation)

Using the charging and discharging experiment, the evaluation of the cycle characteristic of the battery is shown in FIG. 9. Reference numeral 101 shows the cycle characteristic of the manufactured battery where 0.2C is charged and discharged at first and second time followed by 0.5C charges/1C discharges from the third time from which it is illustrated on the graph.

The electrochemical element according to the present invention multiply stacked with full cells or bicells as a unit cell is easy to manufacture, has a structure which uses the space available efficiently, and can especially maximize the content of the active electrode material so that a highly integrated battery can be implemented.

What is claimed is:

1. An electrochemical element comprising electrochemical cells which are multiply stacked, said electrochemical cells fanned by stacking full cells having a cathode, a separator layer, and an anode sequentially as a basic unit, and a separator film interposed between each stacked full cell wherein, said separator film has a length which is determined to wrap the electrochemical cells and folds inward at an increasing unit length to wrap each electrochemical cell starting from the center electrochemical cell to the outermost electrochemical cell continuously, and wherein said increasing unit length corresponds to the width of each cell plus the thickness of the cell or cells to be stacked plus the thickness of the film to be stacked, said thickness of the cell or cells and the thickness of the film incremented as the film is folded.

2. The electrochemical element according to claim 1, wherein an outermost end of said separator film is fixed by taping.

3. The electrochemical element according to claim 1, wherein an outermost end of said separator film is fixed by heat-sealing.

4. The electrochemical element according to claim 1, wherein said separator film is selected from a group consisting of a micro-porous polyethylene film, a micro-porous polypropylene film, or a multi-layer film prepared by a combination thereof, and a polymer film for polymer electrolyte of polyvinylidene fluoride, polyethylene oxide, polyacrylonitrile, or polyvinylidene fluoride hexafluoropropylene copolymer.

5. The electrochemical element according to claim 4, wherein said polymer film for polymer electrolyte comprises a primary micro-porous polymer layer and a secondary gelling polymer layer of polyvinylidene fluoride-chlorotrifluoroethylene copolymer.

6. The electrochemical element according to claim 1, wherein said each cathode of the full cell is an electrode coated with a cathodic material on both sides of a cathode current collector, and said each anode is an electrode coated with an anodic material on both sides of an anode current collector.

7. The electrochemical element according to claim 1, wherein each full cell placed in the outermost side of said electrochemical cell comprises a cathode coated with a cathodic material on a single side of a cathode current collector, or an anode coated with an anodic material on a single side of an anode current collector, and a current collector foil is placed in the outermost side.

8. A method of manufacturing an electrochemical element comprising electrochemical cells which are multiply stacked, said electrochemical cells formed by stacking full cells having a cathode, a separator layer, and an anode sequentially as a basic unit, and a separator film having a length which is determined to wrap the electrochemical cells and folding inward at an increasing unit length to wrap each electrochemical cell starting from the center electrochemical cell to the outermost electrochemical cell continuously, wherein said increasing unit length corresponds to the width of each cell plus the thickness of the cell or cells to be stacked plus the thickness of the film to be stacked, said thickness of the cell or cells and the thickness of the film incremented as the film is folded, said separator film interposed between each stacked full cell, said method comprising the steps of, a) placing a first full cell at a first spot of a side of the separator film, placing a second full cell at a distance corresponding to the width plus thickness of the full cell away in longitudinal direction of the separator film, and placing a third full cell and next full cells at a distance corresponding to the thickness of the full cell plus thickness of the film incremented as the film is folded;

b) laminating the placed full cells and the separator film of a); and c) folding and winding inward the laminated full cells and the separator film of b) to the full cell adjacent next to the first full cell so that each full cell is folded to stack the full cells.

9. The method according to claim 8, further comprising a step of d) fixing the end of said separator film by taping.

10. The method according to claim 8, further comprising a step of e) fixing the end of said separator film by heat sealing which carry out bring a thermo-welding machine, or a hot plate into contact with the separator film.

11. The method of according to 8, wherein the full cell of a) is placed on or below the separator film.

12. An electrochemical element comprising electrochemical cells which are multiply stacked, said electrochemical cells formed by stacking i) a bicell having a cathode; a separator layer; an anode; another separator layer; and another cathode sequentially as a basic unit; and ii) a bicell having an anode; a separator layer; a cathode; another separator layer; and another anode sequentially as a basic unit; and a separator film interposed between each stacked bicells wherein, said separator film has a length which is determined to wrap the electrochemical cells and folds inward at an increasing unit length to wrap each electrochemical cell starting from the center electrochemical cell to the outermost electrochemical cell continuously, and wherein said increasing unit length corresponds to the width of each cell plus the thickness of the cell or cells to be stacked plus the thickness of the film to be stacked, said thickness of the cell or cells and the thickness of the film incremented as the film is folded.

13. The electrochemical element according to claim 12, wherein an outermost end of said separator film is fixed by taping.

14. The electrochemical element according to claim 12, wherein an outermost end of said separator film is fixed by heat-sealing.

15. The electrochemical element according to claim 12, wherein said separator film is selected from a group consisting of a micro-porous polyethylene film, a micro-porous polypropylene film, or a multi-layer film prepared by a combination thereof, and a polymer film for polymer electrolyte of polyvinylidene fluoride, polyethylene oxide, polyacrylonitrile, or polyvinylidene fluoride hexafluoropropylene copolymer.

16. The electrochemical element according to claim 15, wherein said polymer film for polymer electrolyte comprises a primary micro-porous polymer layer and a secondary gelling polymer layer of polyvinylidene fluoride-chlorotrifluoroethylene copolymer.

17. The electrochemical element according to claim 12, wherein said electrochemical cells are formed by alternately stacking i) a bicell having a cathode; a separator layer; an anode; another separator layer; and another cathode sequentially; and ii) a bicell having an anode; a separator layer; a cathode; another separator layer; and another anode sequentially.

18. The electrochemical element according to claim 12, wherein each cathode of the bicell is an electrode coated with cathodic materials on both sides of a cathode current collector, and each anode is an electrode coated with anodic materials on both sides of the anode current collector.

19. The electrochemical element according to claim 12, wherein each bicell placed in the outermost side of said electrochemical cell comprises a cathode coated with cathodic materials on a single side of a cathode current collector, or an anode coated with anodic materials on a single side of an anode current collector, and a current collector foil is placed in the outermost side.

20. A method of manufacturing an electrochemical element comprising electrochemical cells which are multiply stacked, said electrochemical cells formed by stacking i) a bicell having a cathode; a separator layer; an anode; another separator layer; and another cathode sequentially as a basic unit; or ii) a bicell having an anode; a separator layer; a cathode; another separator layer; and another anode sequentially as a basic unit; and a separator film having a length which is determined to wrap the electrochemical cells and folding inward at an increasing unit length to wrap each electrochemical cell starting from the center electrochemical cell to the outermost electrochemical cell continuously, wherein said increasing unit length corresponds to the width of each cell plus the thickness of the cell or cells to be stacked plus the thickness of the film to be stacked, said thickness of the cell or cells and the thickness of the film incremented as the film is folded, said separator film interposed between each stacked bicell, said method comprising the steps of, a) placing a first bicell at a first spot of the separator film and placing a second bicell at a distance corresponding to the width plus thickness of the bicell away in longitudinal direction of the separator film and placing a third bicell and next bicells at a distance corresponding to thickness of the bicell plus thickness of the film incremented as the film is folded;

b) laminating the placed bicells and the separator film in a); and c) folding and winding inward the laminated bicells and the separator film of b) to the bicell adjacent next to the first bicell so that each bicell is folded to stack the bicells.

21. The method according to claim 20, further comprising a step of d) fixing the end of said separator film by taping.

22. The method according to claim 20, further comprising a step of e) fixing the end of said separator film by heat sealing which carry out bring a thermo-welding machine, or a hot plate into contact with the separator film.

23. The method according to claim 20, wherein the bicell of a) is placed on or below the separator film.

24. The method according to claim 20, wherein said electrochemical cells are formed by alternately stacking i) a bicell having a cathode; a separator layer; an anode; another separator layer; and another cathode sequentially; and ii) a bicell having an anode; a separator layer; a cathode; another separator layer; and another anode sequentially.

* * * * *